United States Patent
Ballan et al.

(10) Patent No.: US 10,379,636 B2
(45) Date of Patent: Aug. 13, 2019

(54) TRACKBALL FOR TOUCH SENSOR

(71) Applicant: Advanced Silicon SA, Lausanne (CH)

(72) Inventors: Hussein Ballan, St-Légier (CH); Kevin Fine, Yverdon-les-Bains (CH); Marc Pastre, Ecublens (CH)

(73) Assignee: Advanced Silicon SA, Lausanne (CH)

( * ) Notice: Subject to any disclaimer, the term of this patent is extended or adjusted under 35 U.S.C. 154(b) by 0 days.

(21) Appl. No.: 15/719,060

(22) Filed: Sep. 28, 2017

(65) Prior Publication Data
US 2018/0120967 A1    May 3, 2018

(30) Foreign Application Priority Data

Oct. 28, 2016 (CH) .................................... 1448/16
Mar. 7, 2017 (EP) .................................... 17159703

(51) Int. Cl.
*G06F 3/0354* (2013.01)
*G06F 3/044* (2006.01)

(52) U.S. Cl.
CPC ...... *G06F 3/03549* (2013.01); *G06F 3/03547* (2013.01); *G06F 3/044* (2013.01)

(58) Field of Classification Search
CPC ... G06F 3/03549; G06F 3/03547; G06F 3/044
See application file for complete search history.

(56) References Cited

U.S. PATENT DOCUMENTS

| 5,920,307 A * | 7/1999 | Blonder .................. G09G 5/08 345/164 |
| 2006/0256090 A1 | 11/2006 | Huppi |
| 2010/0231212 A1 | 9/2010 | Yamamoto et al. |
| 2011/0227841 A1 | 9/2011 | Argiro |
| 2013/0012817 A1 | 1/2013 | Ahn |
| 2013/0120258 A1 | 5/2013 | Maus |
| 2014/0002362 A1 | 1/2014 | Srivastava |
| 2015/0033195 A1 * | 1/2015 | Jin .......................... A61B 8/467 715/863 |

FOREIGN PATENT DOCUMENTS

| EP | 0729112 A2 | 8/1996 |
| EP | 2829966 A1 | 1/2015 |

OTHER PUBLICATIONS

European Search Report for EP 17159703.2, dated Apr. 11, 2017, 12 pages.

* cited by examiner

*Primary Examiner* — Robert J Michaud
(74) *Attorney, Agent, or Firm* — Blank Rome LLP

(57) ABSTRACT

System comprising a touch sensor, a trackball and a trackball detector, wherein the trackball comprises a support structure and a ball and is arranged on the touch sensor such that the ball is rotatably supported over the touch sensor surface, wherein a surface of the ball comprises a pattern of detection portions, wherein the touch sensor is configured to detect a position of a touch of an object on a touch sensor surface of the touch sensor, wherein the trackball detector is configured to detect the rotational movement and/or the rotational orientation of the ball on the basis of a movement and/or a position of at least one of the detection portions detected on the touch sensor surface.

16 Claims, 4 Drawing Sheets

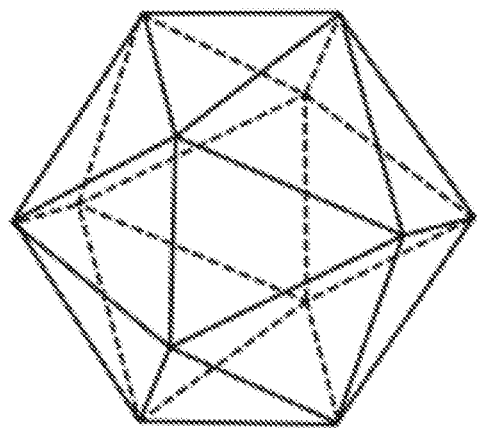
Fig. 3
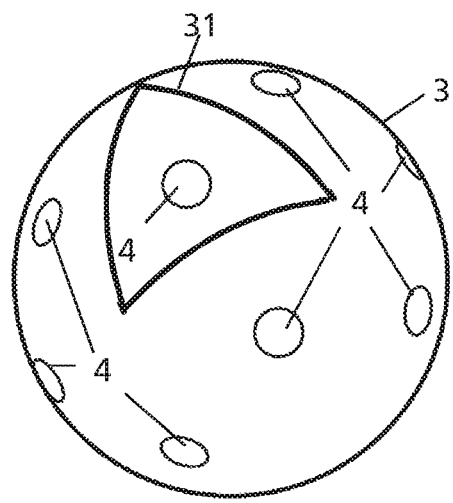
Fig. 4
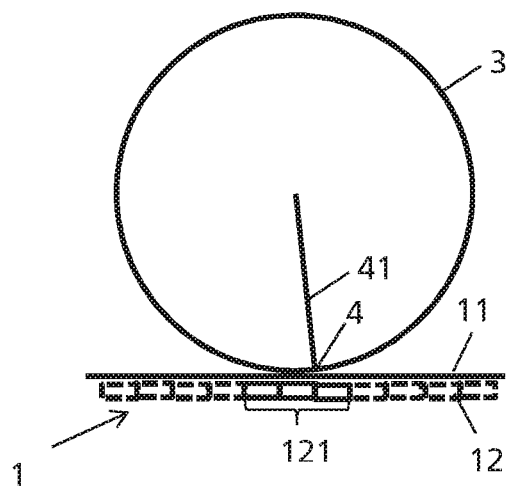
Fig. 5
Fig. 6

US 10,379,636 B2

TRACKBALL FOR TOUCH SENSOR

RELATED APPLICATIONS

This application claims the benefit of Swiss Application No. 01448/16, filed on Oct. 28, 2016, and European Application No. 17159703, filed on Mar. 7, 2017. The entire contents of those applications are incorporated herein by reference.

FIELD OF THE INVENTION

The present invention concerns trackballs for touch sensors.

DESCRIPTION OF RELATED ART

Trackballs as user input are well known. The trackball comprises normally a support structure and a ball rotatably supported in the support structure. The trackball comprises further movement sensors for detecting the change of the rotational position of the ball, e.g. two rollers detecting the polar and azimuth angle. The trackball is connected electrically to an electronic device which receives the detected change of the rotational position of the ball to control the electronic device.

US2014/002362 discloses such a trackball which in addition has a capacitive touch detector for detecting the number and position of fingers on the ball.

EP0729112 discloses a trackball with a ball rotatably supported in a socket. The ball having a conductive pattern and the socket comprising a grid of electrodes for detecting the pattern of the ball in the socket.

US2010/231212 discloses a trackball with a ball rotatably supported in a socket. The ball having a structure made of a ferromagnetic material. The socket having a magnet for inducing a magnetic field in the ball and a magnetic sensor for detecting the structure on the basis of the induced magnetic field.

More and more electronic devices use touch sensors for directly controlling the electronic device by fingers or pens such as, but not limited to, touch pads, touch panels, touch screens. Touch sensors detect passive objects touching the touch device and can determine the position of the touch.

US2011/227841 proposes buttons or joysticks mounted on a flat touch screen surface, wherein the flat touch screen surface detects a capacitive change when the button or joystick is actuated and can thus detect the user input on the button or joystick. It is further suggested a trackball connected wirelessly with a user input device arranged on the flat touch screen surface. A similar disclosure can be found in US2006/256090.

US2013/0120258 proposes buttons or joysticks mounted outside of a flat touch screen surface, but conductively connected with detection portions on the flat touch screen surface. A trackball is also suggested as user input.

EP2829966 discloses a medical device with a touch screen. A mechanical input device is placed on the touch screen and identified by the touch screen so that the touch screen can detect the operation of the mechanical device. The mechanical device could comprise a trackball.

US2013/012817 discloses a portable ultrasonic diagnostic device with a touch panel on the rear side. A trackball can also be mounted on the rear side of the device.

The problem of trackballs in the state of the art is their complexity due to the necessary sensors for detecting the rotational movement of the ball.

BRIEF SUMMARY OF THE INVENTION

Therefore, it is an object to simplify the detection of the rotational movement of the ball of a trackball.

According to the invention, these aims are achieved by means of a system, a method and a computer program according to the independent claims.

Due to the pattern of detection portions on the ball of the trackball, a touch sensor can detect directly the detection portions, when the ball of the trackball is provided on the touch sensor. This allows to simplifying the construction of the trackball and detect the rotation of the ball in the touch sensor. This avoids the necessity of movement sensors in the trackball.

According to the invention, these aims are achieved by a trackball. The trackball comprising a support structure and a ball, wherein the support structure comprises support means for rotatably supporting the ball, wherein the support structure further comprises arrangement means for arranging the trackball on a touch screen, and that the ball comprises a pattern of detection portions which can be detected by the touch screen for detecting the rotational movement and/or position of the ball.

According to the invention, these aims are achieved by a computer program or file containing a list of commands configured to manufacture a trackball as described before, when executed on a 3D printer.

The dependent claims refer to further advantageous embodiments of the invention.

In one embodiment, the pattern of detection portions is arranged such that the detection portions are distributed over the surface of the ball.

In one embodiment, each detection portion has the same shape.

In one embodiment, the detection portions are configured to increase or decrease a capacitive value measured at a touch sensor, when the ball is rotatably supported over a touch sensor surface and one of the detection portions rotates closer to the touch sensor surface.

In one embodiment, the material of the detection portions is a metal.

In one embodiment, the arrangement means is configured to fix the trackball on a touch sensor surface of the touch sensor, wherein the arrangement means and the support means are arranged to each other such that the surface of the ball is arranged in a distance to the touch sensor smaller than 5 mm, when the trackball is fixed by the arrangement means on the touch sensor.

BRIEF DESCRIPTION OF THE DRAWINGS

The invention will be better understood with the aid of the description of an embodiment given by way of example and illustrated by the figures, in which:

FIG. 3 shows an icosahedron as an example of a Platonic solid;

FIG. 4 shows the projection of one polygon of an embodiment of a Platonic solid on a sphere;

FIG. 5 shows an exemplary intensity distribution of a subfield of pixels of a field of pixels of the touch sensor;

FIG. 6 shows a schematic diagram for the detection of a detection portion of the ball of the trackball;

DETAILED DESCRIPTION OF POSSIBLE EMBODIMENTS OF THE INVENTION

Figure 1:
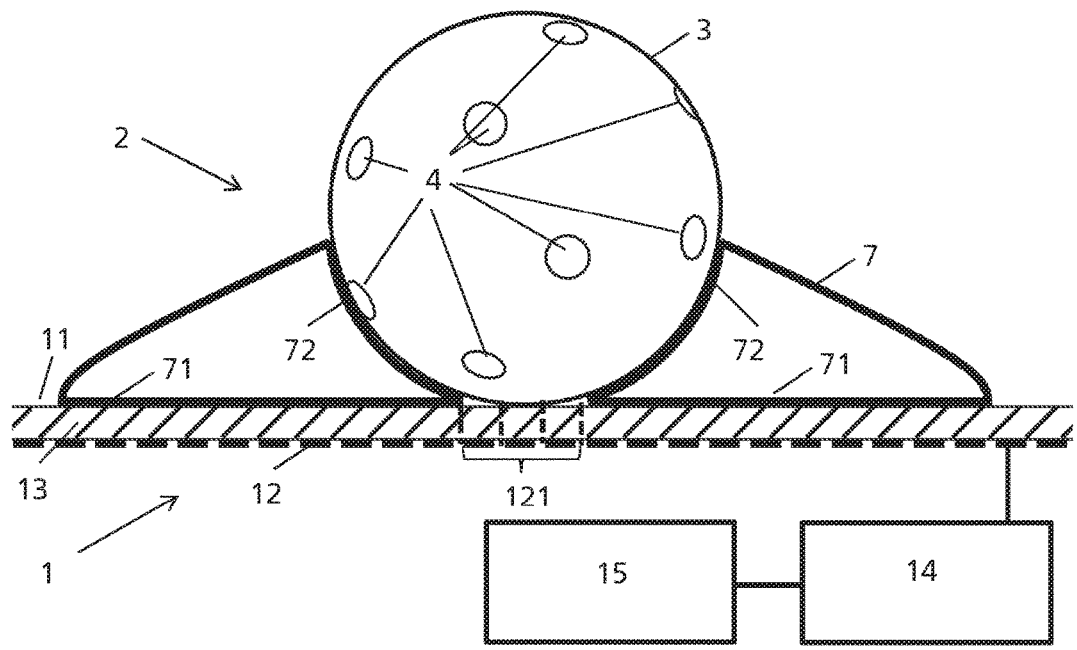
FIG. 1 shows an embodiment of a system with a touch sensor and a trackball.

FIG. 1 shows an embodiment of a system comprising a touch sensor 1, a trackball 2 and a trackball detector 15.

The touch sensor 1 is configured to detect the position of a touch of an object, e.g. a finger or a pen, on a touch sensor surface 11. Such a touch on the touch sensor surface 11 could be detected, when the object directly contacts the touch sensor surface 11 or also when the object comes only into close vicinity to the touch sensor surface 11. The touch sensor surface 11 is preferably flat. The touch sensor surface 11 comprises a field of touch pixels 12 distributed over the touch sensor surface 11. Each touch pixel 12 can detect a physical value indicating the presence of a touch. The physical value is preferably a capacitance value, but could also be an electrical resistance, a pressure, etc. The field of touch pixels 12 is normally two-dimensional, i.e. comprises rows and columns of touch pixels 12. The touch sensor 1 comprises preferably a touch pixel detector 14 which detects successively touch frames. A touch frame is the matrix of physical values measured in all touch pixels 12 at a certain time and/or in a certain time interval. On the basis of succeeding touch frames, a touch on the touch sensor surface 11 can be detected and tracked, if the touch moves. Preferably, the touch sensor comprises a protection layer 13 between the plane of the touch pixels 12 and the touch sensor surface 11. The protection layer 13 can be made for example out of glass or plastic. In one embodiment, the touch sensor 1 is a touch screen, i.e. the touch sensor surface 11 is superposed onto a surface of a display.

The trackball 2 is arranged on the touch sensor 1. The trackball 2 can be part of the touch sensor 1, i.e. can be permanently fixed on the touch sensor 1, or can be detachably/removably fixed on the touch sensor 1. The trackball 2 comprises a support structure 7 and a ball 3. Preferably, the trackball 2 covers (only) a first portion of the touch sensor surface 11 and/or of the surface of the display. Therefore, the touch sensor 1 is configured to detect the presence of another object, like a finger, a pen, etc., in the second portion of the touch sensor surface 11 and/or of the surface of the display (not covered by the trackball 2 and/or being different to the first portion).

The support structure 7 comprises preferably an arrangement means 71 and a support means 72.

The support means 72 support the ball 3 rotatably in the support structure 7 such that the ball 3 can rotate around its centre point. Preferably the ball 3 is supported in the support means 72 such that the ball 3 can rotate in any angular direction (two degrees of freedom) and can be oriented in any angular direction with respect to the support structure 7. However, it is also possible to limit the rotation of the ball 3 to only one rotation axis (one degree of freedom) and/or only to a certain angle range(s).

The arrangement means 71 is configured to arrange the support structure 7 on the touch sensor 1 such that the centre point of the ball 3 has a fixed distance to the touch sensor surface 11, preferably a fixed positional relationship to the touch sensor 1. Preferably, the arrangement means 71 has a fixed positional relationship to the centre point of the ball 3 and/or to the support means 72. However, it is also possible that the centre point of the ball 3 can be translated with respect to the arrangement means 71 and/or the touch sensor surface 11. One embodiment of such a translation could be a movement in the direction of the arrangement means 71 and/or the normal vector of the touch sensor surface 11 (vertical movement), e.g. to realise a button which is released in an upper position and pressed in a lower position. Another additional or alternative embodiment of such a translation could be a translation within the plane of the touch sensor surface 11 (horizontal movement). This horizontal movement could be (only) to position the trackball 2 in a trackball detection state in which the movement of the ball 3 is detected. However, it is also possible to detect in the trackball detection state the movement of the ball 3 and the movement of the trackball 2 or the support structure 7 such that the movement of the ball 3 could be detected also during the horizontal movement of the trackball 2. This allows for example to move the trackball 2 to portions of a touch screen which are in this moment not necessary for the user interaction. It is also possible to use the horizontal movement of the trackball 2 on the touch screen surface 11 as an additional input direction. This horizontal movement could be achieved by horizontal movement means like rollers or gliding means in the support structure 7. These horizontal movement means could be directly in the arrangement means 71, if the trackball 2/support structure 7 is fixed with the horizontal movement means on the touch sensor surface 11. It is however also possible to fix the arrangement mans (detachably or permanently) on the touch sensor 1 outside of the touch sensor surface 11 such that the support structure allows a horizontal movement of the ball 3 or the support means 72 and the support structure has horizontal movement means on the support structure 7 (outside of the arrangement means 71) to support the horizontal movement of the support structure 7 on the touch sensor surface 11. Preferably, the support structure 7 in the latter embodiment allows an horizontal movement of the ball 3 with two degrees of freedom such that the ball 3 can be positioned nearly anywhere an the touch sensor surface 11. Preferably, the arrangement means 71 and the support means 72 have such a positional relationship that the distance between a surface of the ball 3 and the touch sensor surface 11, when the trackball 2 is installed on the touch sensor 1 and/or when the trackball movement is detected (trackball detection state), is smaller than 10 mm, smaller than 5 mm, preferably smaller than 3 mm, preferably smaller than 1 mm. This may also include the case that the distance is 0 and the surface of the ball 3 touches the touch sensor surface 11.

In one embodiment, the arrangement 71 provides a removable fixation on the touch sensor 1. This is preferably achieved by a flat surface (as shown in FIG. 1) or any other means for supporting the support structure 7 (directly and/or only) on the flat touch sensor surface 11, like e.g. a three or four point support. In the case that the means for supporting the support structure 7 on the flat touch sensor surface 11 defines a resting plane (defined by the support surface or the support points or other), the distance between the centre point of the ball 3 and the resting plane corresponds to the distance between the centre point of the ball 3 and the touch sensor surface 11 and/or the distance between the surface of the ball 3 and the resting plane corresponds to the distance between the surface of the ball 3 and the touch sensor surface 11. Preferably, the arrangement means 71 comprises stopping means for stopping a movement of the support structure 7 on the touch sensor 1. This stopping means could stop (only) a movement in the direction of the plane of the touch sensor surface 11, e.g. by friction like with rubber pads or a rubber surface. This stopping means could stop a movement in the direction of the plane of the touch sensor surface 11 and in the direction of the normal of the touch sensor surface 11, e.g. by suction like with suction pads between the arrangement means 71 and the touch sensor surface 11. With the latter, the trackball 2 could also be used on the touch sensor 1, when the touch sensor surface 11 is hold vertically or upside-down. It is however also possible to fix the support structure 7 on the touch screen surface 11 without any stopping means. In addition or alternatively, it is further possible to fix the support structure 7/arrange the arrangement means 71 at the touch sensor 1 outside of the touch sensor surface 11 so that the support structure 7 extends over the touch sensor surface 11 and holds the ball 3 over the touch sensor surface 11. In another embodiment, the support structure 7 could be permanently fixed to the touch sensor 1.

The trackball 2 and/or the support structure 7 is/are configured to access the ball 3 in an access region by a user so that the user can rotate the ball 3, e.g. by his finger or hand. The support structure 7 comprises preferably an opening in a detection region, where the ball 3 is closest to touch sensor surface 11 and/or the resting plane of the support structure 7. The access region is preferably on the opposed site of the ball 3 with respect to the detection region. However, it is also possible that there is no opening between the ball 3 and the touch sensor surface 11 and the detection of a pattern of detection portions 4 of the ball 3 is achieved through the material of the support structure 7.

The ball 3 comprises the pattern of detection portions 4, wherein the pattern of detection portions 4 can be detected by the touch pixels 12 of the touch sensor 1. Preferably, each detection portion 4 being in close vicinity to the touch sensor surface 11 can be detected by the touch pixels 12 of the touch sensor 1. In FIG. 6 only the detection portion 4 being closes to the touch sensor surface 11 is shown. The detection portion 4 can be detected in the touch pixels 12 of a subfield 121 of touch pixels 12 arranged closest to the surface of the ball 3 as shown e.g. in FIGS. 1, 5 and 6. Preferably, the subfield 121 of touch pixels 12 is arranged around the projection of the centre point of the ball 3 on the touch sensor surface 11. Due to the dimension of a touch pixel (e.g. around 5 mm×5 mm) this arrangement is normally not perfectly symmetric around this projection of the centre point of the ball 3. The detection portion 4 could increase or decrease the physical value measured in the touch pixels 12, when the detection portion 4 comes or rotates closer to the touch pixel 12. For a capacitive touch sensor 1, the mutual capacitance between a touch pixel 12 and neighbouring touch pixels could increase or decrease when the detection portion 4 comes closer to the touch pixel 12. The detection portions 4 in vicinity of a touch pixel has thus a different effect than the remaining portions of the ball 3.

The detection portions 4 could be achieved by using a first material for the detection portions 4 and a second material or second materials for the other portions of the ball 3 or of the surface of the ball 3. Preferably, the first material can be detected better by the touch pixels 12 than the second material(s) or the first material increases/decreases the physical value measured by the touch pixel 12 more than the second material. However, it is also possible to achieve detection portions by a structure in the surface of the ball 3 like recesses or protrusions or by other measures. Preferably, a conductive material, even more preferably a metal (e.g. Aluminium) is used as first material. Such materials are well suited for capacitive touch sensors. The used frequencies of capacitive touch sensors are normally lower than the plasma frequency of metals such that the touch sensor 1 creates surface charges on the metallic detection portions 4 which change the mutual capacitances at the touch pixels 12. However, also other first materials like materials with a relative permittivity larger than the relative permittivity of the second material could be used. The second material is preferably made of plastic and/or has a relative permittivity between 1 and 5, preferably larger than 2, preferably smaller than 3. However, it is also possible to use badly detectable material like plastic as detection portions 4 and a well detectable material like metal as remaining portions. The ball 3 can be constructed solid or hollow.

Figure 2:
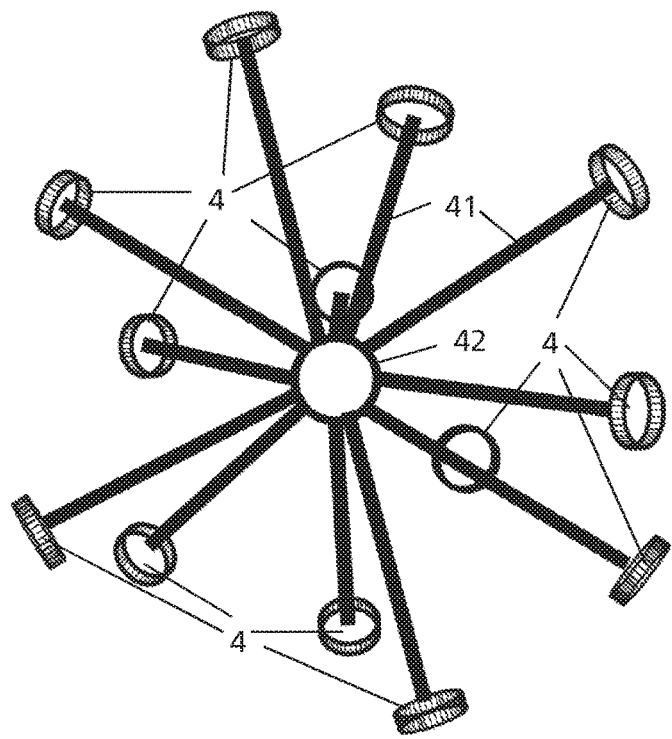
FIG. 2 shows an embodiment of the construction of the detection portions within a ball of the trackball.

In one embodiment, the conductive or metallic detection portions 4 are all electrically or conductively connected. This has the advantage that a user being a large capacity touching one of the detection portions 4 of the ball 3 in the access region is electrically connected to the detection portion 4 in vicinity with the touch sensor surface 11 or the detection region such that the capacitance value of the detection portion 4 in vicinity with the touch sensor surface 11 is increased and the detection is facilitated. Preferably, the conductive connection is achieved inside the ball 3 and not at the surface of the ball 3 such that the conductive connections do not influence the measurements at the touch pixels 12. Preferably, the detection portions 4 are connected with rods or nails 41 extending radially with respect to the centre portion from a connection portion 42 which preferably has a spherical form. Similar to nails, the detection portion 4 (corresponding to the nail head) has a larger diameter than the rod 41 connecting the detection portion 4 with the connection portion 42. To save material and weight the detection portions 4, the rods 41 and/or the connection portion 42 are preferably hollow. An example of such an electrical connection within the ball 3 is shown in FIG. 2.

The detection portions 4 are preferably distributed over the surface of the ball 3, i.e. the detection portions 4 could be arranged on the surface or directly under the surface of the ball 3. Preferably, the detection portions 4 are formed like circles or dots on or under the surface of the ball 3. However, other forms are also possible. The ball 3 is preferably a sphere.

In one embodiment, the pattern of detection portions 4 is preferably such that the pattern of detection portions 4 on the ball 3 looks the same from each detection portion 4. In one embodiment, the pattern of detection portions is configured such that the arrangement of the detection portions with respect to the support structure 7 remains the same, when the ball 3 is rotated by any angle which rotates one detection portion 4 from a position with respect to the support structure 7 such that another detection portion 4 is arranged at the same position with respect to the support structure 7. In one embodiment, an angular distribution of the detection portions 4 of the pattern of detection portions around the centre point of the ball corresponds to the angular distribution of the normal vectors of the polygonal faces of a Platonic solid whose line defined by this vector goes through the centre point of the Platonic solid. A Platonic solid is a regular convex polyhedron constructed by congruent regular polygonal faces with the same number of faces meeting at each vertex (corners). Platonic solids are for example a tetrahedron (four triangles), a cube (six squares), a octahedron (eight triangles), a dodecahedron (twelve pentagons) or a icosahedron (twenty triangles). Therefore, the preferred number of detection portions 4 is (exactly) 4, 6, 8, 12 or 20. An icosahedron is shown in FIG. 3. With such an angular distribution of the detection portions 4, the surface of the ball 3 (sphere) can be divided in a number of identical spherical polygons 31 around the detection portions 4 which correspond to the projection of the polygons of the Platonic solid on the surface of the ball 3 or the surface of a sphere. FIG. 4 shows the projection 31 of the triangle of an icosahedron on the surface of the ball 3, wherein the detection portions 4 are arranged in the centre of each projection region 31. Thus if the touch signals in the subfield 121 are known for all points in the red triangle which touch the touch sensor surface (or are closest to the touch sensor surface), then they are known for all positions of the surface of the ball 3. Due to the symmetry of the Platonic solid, the detection region 31 around each detection portion 4 has the same detection behaviour. In one embodiment, the angular distribution of the detection portions 4 of the pattern of detection portions around the centre point of the ball corresponds to the angular distribution of the normal vectors of the vertices (corners) of a Platonic solid. For example, the angular distribution of the 20 normal vectors of the icosahedron corresponds to the angular distribution of the 20 vertices of the dodecahedron. Even if this symmetric pattern of detection portions 4 is preferred, other patterns of detection portions 4 are possible. If the orientation of the ball 3 is important, a pattern without any symmetry could be used such that each angular orientation of the ball 3 leads to another distribution at the subfield 121 of touch pixels 12 under the ball 3.

The trackball 2 does not need any electronics for detecting the movement and/or position of the ball 3, because the movement and/or position of the ball 3 is detected by the touch sensor 1 and/or the trackball detector 15. This allows reducing the complexity and manufacturing time and material of the trackball 2. Obviously, it is not excluded that the trackball 2 could have additional electronics.

Figure 7:
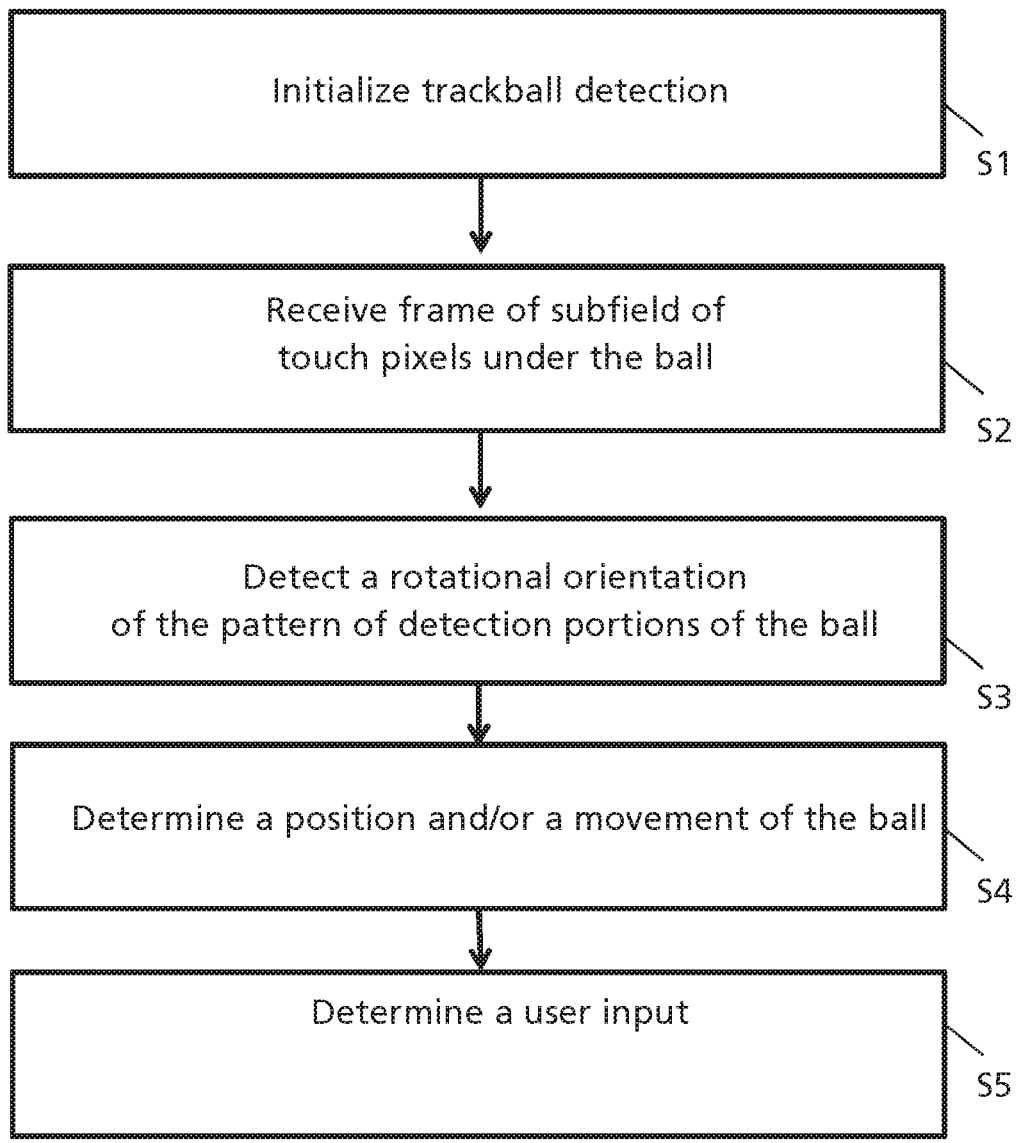
FIG. 7 shows an embodiment of a method to read out a trackball.

The trackball detector 15 is configured to detect the position and/or the movement of the ball 3 of the trackball 2. The trackball detector 15 could be part of the touch sensor 1, if the touch sensor 1 has the necessary processing capabilities, e.g. as usually the case in tablets and smartphones. The trackball detector 15 could however also be part of a separate computing device connected to the touch sensor 1. The trackball detector 15 could be implemented on the firmware/system level or on the application program level. In the following, an embodiment of a detection method is described in relation with FIG. 7.

In an optional first step S1, the trackball detector 15 is initialized.

One possible initialization step could be to detect the existence of a trackball 2 on the touch sensor surface 11, if the trackball 2 is removable. This could be done by detecting a certain trackball pattern in the touch frames received from the touch sensor 1 or from the touch pixel detector 14. The trackball pattern could be a fixed trackball pattern caused by a determined further detection portion in the support structure. The further detection portion could be formed as proposed for the detection portions 4 on the ball 3 by material, like a metal, well detectable or by a form of the arrangement means. Such a determined further detection portion causes a well-defined pattern of the trackball in a touch frame of the touch sensor 1. Alternatively, the patterns caused by the pattern of detection portions of the ball 3 in the touch frame(s) of the touch sensor 1 could be detected in one or several touch frames. The detection of the presence of a trackball 2 on the touch sensor 1 could be performed with a smaller frequency than the sample frequency of the touch sensor 1 in order to save energy. However, it is also possible to detect the presence of the trackball 2 on the touch sensor surface 11 by other means than the touch pixels, e.g. a button or sensor for detecting the presence of the trackball 2. Once the trackball 2 is detected, the trackball detection algorithm or method or other initialization steps could start.

Another possible initialization step is to detect the position and/or orientation of the trackball 2 or of the support structure 7 on the touch sensor surface 11. Preferably, this is used to determine the subfield 121 of touch pixels 12 under the ball 3. This could also include to determine the number of pixels and/or the size of the subfield 121 based on the position and/or orientation of the trackball 2 on the touch sensor surface 11 or on the relative offset of the point on the touch sensor surface 11 being closest to the ball 3 to touch pixels 12. However, this step could also be optional, if the trackball 2 can only be installed in one position and/or orientation or if the subfield 121 can be obtained in another way. In one embodiment, the position and/or orientation of the trackball 2 could be used to determine the relative offset of the point on the touch sensor surface 11 being closest to the ball 3 to the touch pixels 12 of the subfield 121. The point on the touch sensor surface 11 being closest to the ball 3 corresponds normally to the centre point of the ball 3. The relative offset could be used to improve the detection of the detection portions 4 in the subfield 121. If the horizontal movement of the trackball 2 is detected during the trackball detection state, this step could be performed between steps S2 and S3.

In a second step S2, the trackball detector 15 receives a subfield frame of the subfield 121 of touch pixels 12 from the touch sensor 1 and/or from the touch pixel detector 14. The subfield frame contains the physical values of the touch pixels 12 related to the subfield 121 measured at one time instance or in one time interval (e.g. sampling period). In one embodiment, step S2 comprises as well extracting the subfield frame from the touch frame with the knowledge of the touch pixels 12 being part of the subfield 121.

In a third step S3, a rotational orientation of the pattern of detection portions 4 of the ball 3 is detected based on the subfield frame. Preferably, the position of one of the detection portions 4, i.e. the one being closest to the touch sensor surface 11, on the subfield 121 or the orientation of one of the detection portions 4 of the ball 3 is detected based on the distribution of values on the subfield of the subfield frame. The projection of the centre point of the detection portion 4 on the subfield 121 is represented in the subfield frame by the maximum of a Gaussian or Gaussian like distribution. Once the projection of the centre point of the detection portion 4 on the subfield 121 is known, the orientation of the pattern of detection portions 4 can be determined. E.g. the centre of gravity could be used to detect the position of the projection of the centre point of the detection portion 4 on the subfield 121, however other methods are possible like e.g. parametric fitting of a certain function (e.g. a Gaussian function) over the measured distribution. Since each region 31 around each detection portion 4 has the same detection behaviour, the orientation of the detection pattern is known. Alternatively, the subfield frame could be compared with a lookup table to detect the actual position of the pattern of detection portions 4.

In a fourth step S4, the position and/or movement of the ball 3 is determined based on the detected actual rotational orientation of the pattern of detection portions 4 of the ball 3. To determine the absolute position of the ball 3, it is necessary to know the initial position of the ball 3 or to use a pattern of detection portions 4 on the ball 3 which provides at each orientation a unique distribution in the subfield 121 of touch pixels 12. A relative position (rotational orientation) of the ball 3 with respect to one start position of the ball 3 could be detected by adding up the positional changes from one subfield frame to the other. A movement of the ball 3 can be computed based on the rotational orientation of the pattern of detection portions 4 of the ball 3 detected in step S3 and one or more rotational orientations of the pattern of detection portions 4 of the ball 3 detected previously.

In an optional fifth step S5, if the detection of the ball 3 shall be used for user input, the actual position and/or movement of the ball 3 could be transferred into a user command as well known in the state of the art.

The steps S2 to S4 or S5 are repeated for subsequent subfield frames. Preferably for each determined touch frame, a subfield frame is determined in step S2. However, it is also possible to use only some of the determined touch frames. It is also possible to reduce the frequency of processed subfield frames in certain situations, e.g. when no movement or positional change of the ball 3 was detected before or when the user does not touch the ball 3. The latter could be detected for example, because the touch of the user could change the intensity values measured at the touch pixels 12 of the subfield 121. It is also possible to increase the frequency of processed subfield frames, e.g. when the rotational velocity of the ball 3 increases over a threshold.

In the embodiment shown before, the detection portions 4 are passive. In another embodiment, the detection portions 4 could be active. In this case, an electronic signal is applied on the detection portions 4 which improves the detection quality of the detection portions 4 on the touch sensor 1.

Preferably, the electric signal is continuously emitted, i.e. not needing any synchronisation with some active object detection time period of the touch sensor. Normally, the touch sensor 1 has a sampling period in which all active and passive objects on the touch sensor 1 are detected. This sampling period is repeated in the frequency of the sampling frequency. The sampling period comprises an active object detection period in which active objects on the touch sensor 1 are detected and a passive object detection period in which passive objects, like a finger or the above described passive trackball, on the touch sensor 1 are detected. Continuously emitting means now that the electric signal is also applied to the detection portions 4 in the passive object detection period of the touch sensor in which the touch sensor 1 detects touches from passive objects like fingers. The electric signal applied to the detection portion(s) being in the subfield 121 (in the sampling period or more exactly in the active object detection period) is detected in the touch sensor 1. Due to the electric signal, the error of the position of the detection portion (4) on the subfield is reduced.

Figure 8:
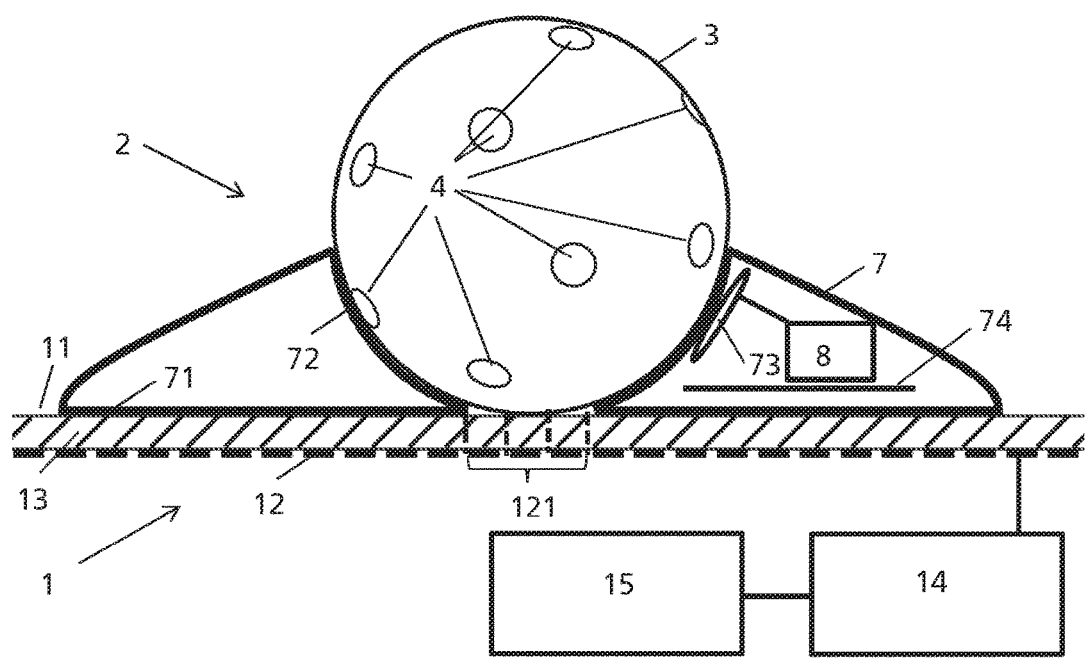
FIG. 8 shows another embodiment of a system with a touch sensor and a trackball.

A signal generator in the trackball 2 creates the electric signal applied to the detection portions 4. The signal generator could be arranged in the ball 3 or in the support structure 7. In the embodiment shown in FIG. 8, the signal generator 8 is in the support structure 7 and the electric signal from the signal generator 8 is transferred from the support structure 7 to the ball 3 with a contact region 73 in the support means 72 arranged and large enough to contact always at least one detection portion 4 of the ball 3. The electric signal is then distributed from the at least one detection portion 4 in contact with the contact region 73 to all other detection portions 4 conductively connected. In one embodiment, the support structure 7 comprises a shield 74 between the contact region 73, the signal generator 8 and/or its conductor between them and the arrangement means 71 (e.g. the support surface) and/or the touch sensor surface 11 in order to shield the touch sensor 12 from the electric signal.

If the signal generator is in the ball 3, it could be arranged in the connection portion 42, preferably at the centre of the ball 3. Preferably, a printed circuit board is arranged in the connection portion 42 to be connected over the connection portion 42, the nails or rods 41 to the detection portions 4. The power for a signal generator located in the ball 3 could be provided by an energy source in the ball 3, e.g. a battery, or come from the support structure 7, e.g. over a contact region as described in FIG. 8.

Preferably, the detection portions 4 are made out of a conductive material. Preferably, all detection portions 4 are connected and emit all the same electronic signal (may be with a phase difference). The detection portions 4 could also be realised with a smaller surface than in the passive trackball 2, e.g. also as a points 4 emitting the electric signals.

The invention claimed is:

1. System comprising
a touch screen, wherein the touch screen comprises
a display and
a touch sensor with a touch sensor surface,
wherein the touch sensor surface is superposed onto a surface of the display,
wherein the touch sensor is configured to detect a position of a touch of an object on the touch sensor surface,
a trackball detector, and
a trackball unit, a wherein the trackball unit comprises
a ball and
a support structure,
wherein the support structure rotatably supports said ball,
wherein the support structure is distinct from the touch sensor,
wherein the trackball unit is arranged on the touch sensor such that the ball is rotatably supported over the touch sensor surface by the support structure,
wherein a surface of the ball comprises a pattern of detection portions, and
wherein the trackball detector is configured to detect the rotational movement and/or the rotational orientation of the ball on the basis of a movement and/or a position of at least one of the detection portions detected on the touch sensor surface.

2. System according to claim 1, wherein a surface of the ball is arranged in a distance to the touch sensor surface smaller than 5 mm.

3. System according to claim 1, wherein the touch sensor surface comprises a field of touch pixels, wherein the movement and/or the position of the at least one of the detection portions is detected on the basis of a subfield of touch pixels arranged around the projection of the centre point of the ball on the touch sensor surface, wherein the subfield comprises at least two touch pixels in a first direction and at least two touch pixels in a second direction.

4. System according to claim 1, wherein the pattern of detection portions is configured such that the pattern of the detection portions with respect to the support structure remains the same, when the ball is rotated by any angle which rotates one detection portion from a rotational position with respect to the support structure such that another detection portion is arranged at the same position with respect to the support structure.

5. System according to claim 1, wherein an angular distribution of the detection portions of the pattern of detection portions around the centre point of the ball corresponds to the angular distribution of the normal vectors of the polygonal faces of a Platonic solid going through the centre point of the Platonic solid.

6. System according to claim 1, wherein the detection portions are made of a first material arranged in a second material, wherein the first material is better detectable by the touch sensor than the second material.

7. System according to claim 1, wherein the detection portions are made of a conductive material and the detection portions are conductively connected.

8. System according to claim 7, wherein the detection portions are formed like nails extending from a connection portion at the centre point of the ball.

9. System according to claim 8, wherein the detection portions, the nails and/or the connection portion is/are hollow.

10. System according to claim 1, wherein the trackball unit defines an access region where the ball is accessible for a user for rotating the ball.

11. System according to claim 1, wherein the touch sensor is configured to detect the position of the touch of the object being different from the trackball unit, preferably of a finger, on the basis of a capacitive change in the touch sensor on the position of the touch of the object on the touch sensor surface.

12. System according to claim 1, wherein the trackball unit comprises a signal generator configured to apply an electric signal on the detection portions.

13. System of claim 1, wherein the touch sensor surface is a flat touch sensor surface.

14. Method for determining a user command on the basis of the rotation orientation of a ball of a trackball unit arranged over a touch sensor surface of a touch sensor of a touch screen, wherein the trackball unit comprises the ball with a pattern of detection portions and a support structure, wherein the support structure rotatably supports said ball, wherein the support structure is distinct from the touch sensor,
the method comprising the following steps:
receiving a measurement frame of a subfield of touch pixels of the touch sensor arranged under the ball;
determining a rotational orientation of the pattern of detection portions on the basis of the measurement frame of the subfield;
determining the user command on the basis of the rotation orientation of the ball.

15. Method according to claim 14, wherein the rotational orientation of the ball is detected for subsequent measurement frames of the subfield and a movement of the ball is determined and the user command is determined on the basis of the movement of the ball.

16. Touch screen configured to detect a position of a touch of an object on a touch sensor surface of a touch sensor of the touch screen and comprising a track detector configured to perform the following steps:
receiving a measurement frame of a subfield of touch pixels of the touch sensor arranged under a ball of a trackball unit, wherein the trackball unit comprises also a support structure, wherein the support structure rotatably supports said ball, wherein the support structure is distinct from the touch sensor;
determining a rotational orientation of the pattern of detection portions on the basis of the measurement frame of the subfield;
determining a user command on the basis of the rotation orientation of the ball.

* * * * *